VARIABLE AMPLITUDE VIBRATORY UNIT FOR VIBRATORY MACHINES

Original Filed July 30, 1962 2 Sheets-Sheet 1

Inventor:
Rowland Percy Green
By Baldwin & Wight
Attorneys

VARIABLE AMPLITUDE VIBRATORY UNIT FOR VIBRATORY MACHINES

Original Filed July 30, 1962 2 Sheets-Sheet 2

Inventor:
Rowland Percy Green
BY Baldwin & Wight
Attorneys

United States Patent Office

Re. 25,861
Reissued Sept. 21, 1965

25,861

VARIABLE AMPLITUDE VIBRATORY UNIT FOR VIBRATORY MACHINES

Rowland Percy Green, Bath, Somerset, England, assignor to Stothert & Pitt, Limited, Bath, England, a corporation of Great Britain Original No. 3,145,631, dated Aug. 25, 1964, Ser. No. 213,199, July 30, 1962. Application for reissue Nov. 25, 1964, Ser. No. 429,691
Claims priority, application Great Britain, Sept. 18, 1961, 33,399/61
6 Claims. (Cl. 94—48)

Matter enclosed in heavy brackets [ ] appears in the original patent but forms no part of this reissue specification; matter printed in italics indicates the additions made by reissue.

This invention relates to [road rollers] *variable amplitude units for operating elements of machines* which vibrate. *One class of vibratory machines in which the variable amplitude unit of the present invention may be incorporated is the class of vibratory road rollers, and the invention is illustrated and described, by way of example, as being embodied in such a machine.*

The use on a road roller of an out-of-balance shaft as the vibrating unit has certain advantages and it is now recognised that under certain operating conditions it is desirable for the amplitude of the vibrating unit to be adjustable in order that it can be varied to suit the characteristics of the ground undergoing compaction.

The assignee of the present applicant has, for many years, made use, in vibratory concrete compacting and finishing machines, of a vibrating beam having a high frequency vibrating unit with adjustable eccentric disc weights.

In a vibratory roller, the problem, facing the designer of a suitable variable amplitude unit, is mainly one of limitations of space and the use of a number of eccentrically mounted discs carried by the roller spindle, owing to the space taken up by the discs, and the difficulty of adjustment by control means, accessible from outside the roller shell, renders them totally unsuitable for the purpose.

The present invention has for its object a construction which is robust and will withstand the wear and tear to which [such] *vibratory* machines are subjected when in use and which, at the same time, is simple and can be manufactured at comparatively low cost.

According to one embodiment of the present invention, a variable amplitude unit for a vibratory roller comprises a shaft mounted in a roll shell, the mounting having stub axes on which the roll is free to rotate. Provided on the shaft [is a pair or] *are* pairs of eccentrically operating weights, which are capable of angular displacement about independent parallel axes transverse to the shaft and so arranged as to counterbalance each other axially in all positions of adjustment. Preferably two axially spaced pairs of weights are provided and adjustment of each pair of eccentric weights is by means of members supported by the shaft and connected through lever mechanisms to their respective pairs of weights, movements being imparted to said members from a control rod [or shaft] extending through a bore in the shaft and accessible at one end from outside the roll shell.

The [roller spindle] *shaft* may be [in the form of a] composite, [shaft] consisting of two outer axle elements connected by a central sleeve, each axle element having a central bore in which the control rod is free to revolve.

The central sleeve provides a housing for the members and lever mechanisms by which adjustment of the eccentric weights is effected, the weights, which are mounted outside the sleeve, being arranged with the weights of each pair on opposite sides of the shaft.

A preferred embodiment of the invention is shown in the accompanying drawings in which.

Figure 1:
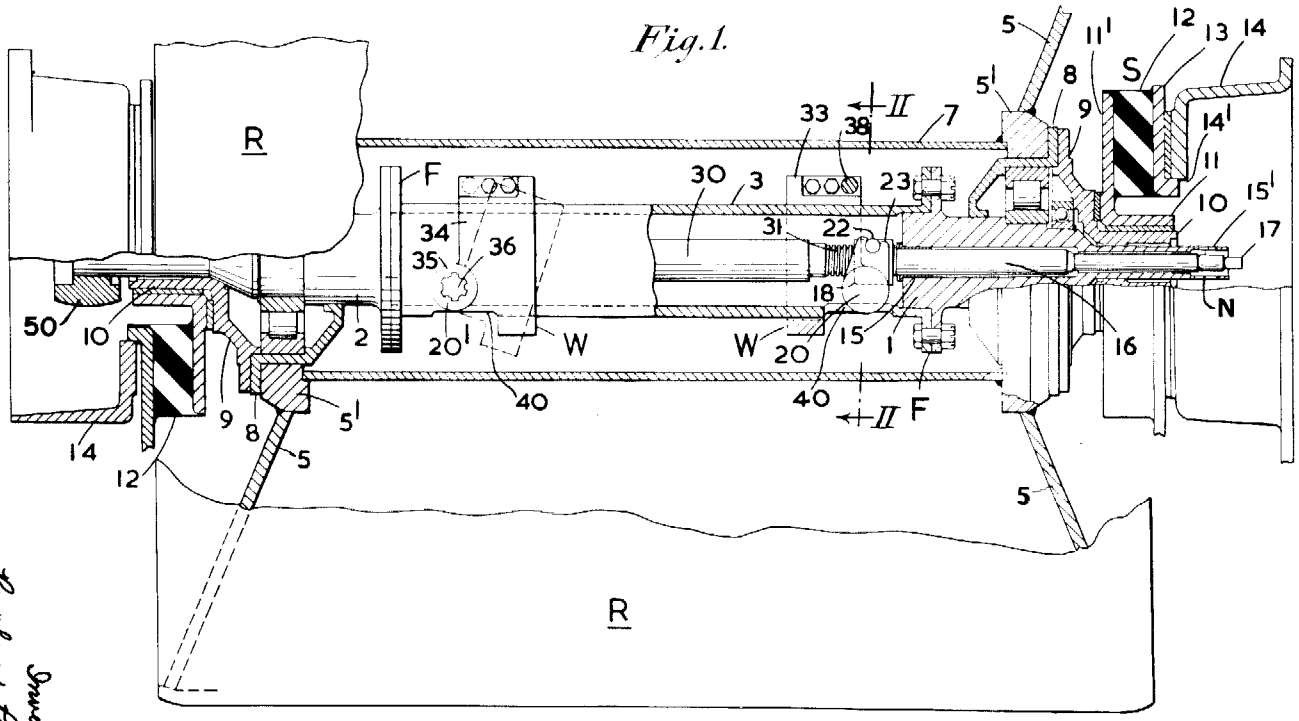
FIGURE 1 is a transverse section showing the roller shell and variable amplitude unit.

In the drawings the *vibratory* roll shell *element* is indicated at R and the roller embodies shear suspension mountings indicated generally at S, each mounting, as hereinafter described in detail, comprising two components having faces arranged in vertical planes to which is bonded a rubber block or blocks.

In this invention the vibratory shaft is provided with eccentrically operated weights, indicated generally at W, the weights being capable of angular adjustment in order to vary the amplitude of vibration of the unit.

The vibratory shaft is made up of two axle components 1, 2 joined to one another by a central sleeve 3, the sleeve and components 2 and 3 having radial flanges *F* by which they are secured to one another by fixing bolts.

The roll shell R comprises end plates 5 each secured by welding to a central ring 5', the rings 5' at each end being spaced apart by a cylindrical distance piece 7 welded thereto.

Secured within each end ring 5' of the roll shell is a bearing housing made up of two parts, an outer part 9 having a spigot 10, and an inner part cap piece 8, in which is formed a shoulder to locate in the ring 5'. The parts 8, 9, 10 are duplicated at the other end of the roller and it will be seen that the axle elements 1, 2 are mounted to revolve in suitable bearings within each bearing housing 8–9, *the shaft 1, 3, 2 being thus connected to the vibratory roll shell element R through the outer bearing surfaces of the shaft ends 1, 2.*

Each shear suspension S comprises a flanged bush part 11 which journals the associated spigot 10, and an outer ring part 13, the bush 11 having a flange 11' between which and the ring 13 an annular block 12 of rubber is bonded, the ring 13 in turn being supported by an end cap 14 on the end frames of the main frame. Each end cap 14 is connected to and thus constitutes a part of the roller frame. In each cap 14 is an aperture 14' through each of which apertures 14' the respective axle elements 1, 2 and spigot 10 are accessible. The shaft assembly 1, 3, 2 is rotatable by a pulley 50 fixed to the shaft component 2.

Each of the axle elements 1, 2 is provided with an axial bore 15 to receive the opposite (reduced) ends 16 of a control rod 30 by which adjustment of the weights W is effected, as hereafter explained.

Figure 2:
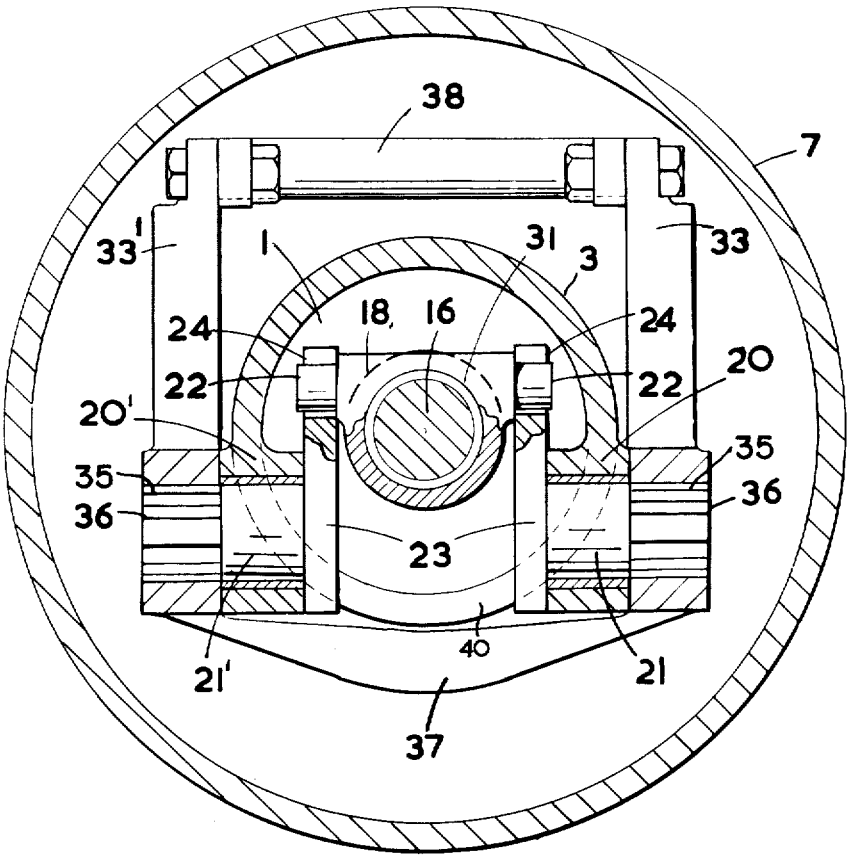
FIGURE 2 is a transverse sectional view on an enlarged scale on the [lines] *line* II—II of FIGURE 1.

Referring also now to FIGURE 2, the central section 3 of the [axle] *shaft 1, 3, 2* is formed with two pairs of bearing housings indicated respectively at 20, 20', *the housings of* each pair being axially spaced apart from *the housings of the other pair* [each other] *axially of the shaft 1, 3, 2.* The bearing housings of each pair [extend] *are spaced from each other* transversely [to] *of* the axis of the shaft and are in alignment with each other so as to provide mountings for spindles 21, 21', each spindle having an integral crank arm 23. The arms 23 are positioned centrally, i.e. within the hollow of [axle] *the sleeve* 3, and have forked or slotted ends 24 for engagement with laterally projecting trunnion studs 22 on nuts *or threaded members* 18. The nuts 18 engage threaded portions 31 on the control rod 30. The threads of one nut 18 and the cooperating threaded portion 31 of the control rod 30 are of one hand, and the threads of the other nut 18 and the cooperating threaded portion 31 of the control rod 30 are of the opposite hand. Therefore, on rotation of the control rod 30, the nuts will be moved axially inwards or outwards according to the direction of rotation of the rod. The control rod can be rotated by means of a crank handle that can be engaged with a squared end 17 on control rod end 16 that projects beyond the outer end of a tubular extension 15' of the axle element 1.

The two eccentric weights W are arranged in pairs and comprise rectangular plates 33, 33' and 34 which are keyed, as indicated at 35, to splines 36 on the outer ends of spindles 21, [21] *21'* so that the weights of each pair lie on opposite sides of the shaft 1–3–2.

*The weights W of each pair of weights are connected by a U-shaped strap 37 and also by a cross bar 38 which acts as a stop for limiting the maximum angular displacement of the weights.*

[In order to limit the maximum angular displacement of the weights they are interconnected by U-shaped straps 37, each having a cross bar 38 which acts as a stop.]

It will be seen that the central sleeve 3 provides a housing for the members and lever mechanisms by which adjustment of the eccentirc weights 33, 33', 34 is effected, while the weights, which are mounted outside the sleeve, are arranged in pairs with the weights of each pair on opposite sides of the sleeve.

In operation the vibratory shaft 1–3–2 rotates with the weights W attached thereto in a fixed position as required and are adjusted through the control rod 30 by means of a handle (not shown) attatched to the squared end 17.

It will be obvious that rotation of the control rod 30 will cause the nuts 18 to move either towards or away from one another depending upon the adjustment required.

Movements of the nuts 18 in an axial direction cause the levers 23 to rotate about their fulcrums on the spindles 21, [21] *21'* in such a manner that each pair of weights 33, 33', 34—34 which are attached to the spindles 21, [21] *21'* will also rotate about these fulcrums.

With the weights in the extreme position as indicated by the dotted outlined position, maximum amplitude will be produced in the unit for the reason that the centre of gravity of the eccentric weights is offset from the centreline of the shaft to the greatest extent possible, and therefore produces the maximum out-of-balance moment. It will be obvious from the description that the two pairs of weights 33, 33', 34 will move in unison to produce greater or lesser out-of-balance moments as required.

The advantages gained from the vibrator unit of this invention are:

(1) Two sets of eccentric weights only are used as opposed to the more expensive and complex system of using heavy eccentric shafts.

(2) The arrangement of eccentric weights pivotally mounted on an axis at right angles to that of the shaft enables exceedingly light and simple weights to be used.

(3) The out-of-balance moments of the weights as arranged produce counterbalanced axial forces in the vibrating shaft such that no locking device is required and the clearances between the nuts 18 and the control rod 30 are taken up by the dynamic force present, resulting in the elimination of possible chatter and wear.

(4) Variation of the setting can be carried out simply and with little effort.

A simple visual setting indicator viewable through a slot such as shown at N, may be incorporated.

For the purpose of adjustment access slots 40 are provided in the central section 3 of the vibratory shaft opposite the threaded portions mounting the collars or nuts 18.

What is claimed is:

1. In a vibratory roller having a roller frame, the combination of a shaft; means journalling said shaft to rotate with respect to the roller frame; a roll shell journalled to revolve on the shaft; pairs of eccentrically operating weights mounted on said shaft to set up an unbalance, the weights of each of said pairs being mounted respectively on opposite sides of the shaft for pivotal movements about an axis transverse to the axis of said shaft whereby to move in the axial direction of the shaft; means for effecting adjustment of said weights including a rotatable control rod extending through said shaft, said rod being provided with oppositely threaded portions proximate to each pair of weights; and means on each of said *pairs of* weights cooperating with the respective threaded portions of the control rod, whereby rotation of the said rod will angularly adjust the *pairs of* weights in equal and opposite directions.

2. Variable amplitude unit for a vibratory [roller] *machine* including a [roll shell] *vibratory element*, said unit comprising a shaft having bearing surfaces [at its ends for journalling the roll shell] *through which said shaft is connected to said vibratory element* and including a central hollow section; pairs of eccentrically operating weights carried by the shaft for setting up an unbalance, the weights of each of said pairs being mounted respectively on opposite sides of the hollow section of said shaft for pivotal movements about an axis transverse to the axis of said shaft whereby to move in the axial direction of the shaft; control means for effecting adjustment of said weights including a rotatable rod extending through the hollow section of said shaft and having threaded portions proximate to each pair of weights, each end section of the shaft having an axial bore to receive said rod; threaded members mounted on the threaded portions of the control rod for movement axially with respect to said control rod; and means interconnecting said members respectively with each pair of weights for effecting angular adjustments of the weights in equal and opposite directions in response to rotation of said rod.

3. Variable amplitude unit as claimed in claim 2 in which the hollow section of said shaft is provided with bearing housings, and in which said interconnecting means comprises spindles mounted in said housings respectively; and means connecting said spindles respectively to said members and to said weights.

4. In a vibratory roller having a roller frame, the combination of a vibratory shaft, a roll journalled to revolve on said vibratory shaft, said roll including a shell having end plates, each end plate including a two-part housing, one part of said housing having a bearing by which the shell is journalled to revolve on the vibratory shaft, and the other part of said housing having a spigoted end by which the roll is journalled within the roller frame; pairs of eccentrically operating weights mounted on said shaft to set up an unbalance, the weights of each pair being mounted respectively on opposite sides of the shaft for pivotal movements about an axis transverse to the axis of said shaft whereby to move in the axial direction of said shaft; means for effecting adjustment of said weights including a rotatable control rod extending through the vibratory shaft, said rod being provided with threaded portions proximate to each pair of weights; and means operatively connecting the weights of said pairs respectively with the threaded portions of said control rod, whereby rotation of the control rod will effect angular adjustment of the weights in equal and opposite directions.

5. A vibratory roller as claimed in claim 4 having a resilient suspension comprising a bush member within which the spigoted end of the roller end plate housing is carried; a second member attached to the roller frame, each of said members having a vertical face; and a member of resilient material connecting said vertical faces.

6. In a vibratory roller having a roller frame, the combination of a shaft; means journalling said shaft to rotate with respect to the roller frame; a roll shell journalled to revolve on said shaft; pairs of eccentrically operating weights mounted on said shaft in spaced relation axially of said shaft to set up an unbalance, the weights of each of said pairs being mounted respectively on opposite sides of said shaft for pivotal movements about an axis transverse to the axis of said shaft whereby, upon pivotal movement, the weights will move also in the axial direction of the shaft; and means for effecting an axial adjustment of said weights including a movable control rod extending through said shaft; and means connecting said control rod respectively to said pairs of weights and being responsive to movement of said rod for rocking said pairs of weights about their respective transverse axes.

References Cited by the Examiner

The following references, cited by the Examiner, are of record in the patented file of this patent or the original patent.

UNITED STATES PATENTS

| | | |
|---|---|---|
| 2,516,335 | 7/50 | Nevin et al. |
| 2,671,386 | 3/54 | Kerridge. |
| 3,000,278 | 11/61 | Kaltenegger. |

JACOB L. NACKENOFF, *Primary Examiner.*